US009502194B2

(12) United States Patent
Wan

(10) Patent No.: US 9,502,194 B2
(45) **Date of Patent: *Nov. 22, 2016**

(54) PLASTIC-SHELL-ENCASED CIRCUIT BREAKER HAVING AUTOMATIC LOCKING FUNCTION

(75) Inventor: Jiasheng Wan, Wuhan (CN)

(73) Assignee: HUBEI SHENGJIA WIRING CO., LTD., Wuhan, Hubei (CN)

( * ) Notice: Subject to any disclaimer, the term of this patent is extended or adjusted under 35 U.S.C. 154(b) by 535 days.

This patent is subject to a terminal disclaimer.

(21) Appl. No.: 13/982,716

(22) PCT Filed: Jan. 17, 2012

(86) PCT No.: PCT/CN2012/000085

§ 371 (c)(1), (2), (4) Date: Oct. 12, 2013

(87) PCT Pub. No.: WO2012/100650

PCT Pub. Date: Aug. 2, 2012

(65) Prior Publication Data

US 2014/0367232 A1 Dec. 18, 2014

(30) Foreign Application Priority Data

Jan. 30, 2011 (CN) .......................... 2011 1 0036761

(51) Int. Cl.
*G05B 19/00* (2006.01)
*H01H 27/10* (2006.01)
(Continued)

(52) U.S. Cl.
CPC ............. *H01H 27/10* (2013.01); *H01H 9/223* (2013.01); *H01H 9/54* (2013.01); *H01H 21/04* (2013.01);
(Continued)

(58) Field of Classification Search
CPC .......... G06F 21/35; G06F 21/32; G06F 21/31; G06F 21/88; B60R 25/04; H01H 27/10
(Continued)

(56) References Cited

U.S. PATENT DOCUMENTS 6,703,938 B1 * 3/2004 Clarke ................. G01R 19/155
340/638
6,734,379 B1 * 5/2004 Savadian .................. B25F 5/00
200/41
(Continued)

*Primary Examiner* — Kerri McNally
*Assistant Examiner* — Sharmin Akhter

(57) ABSTRACT

A plastic-shell-encased circuit breaker having an automatic locking function comprises a plastic-shell-encased circuit breaker body, a user input unit for inputting a lock code or an unlock code; an authentication processing unit for receiving the lock code or the unlock code from the user input unit, and for outputting a control signal after authentication; a locking action unit for receiving the control signal from the authentication processing unit, and for enabling the plastic-shell-encased circuit breaker body to produce a self-locking or unlocking action. Utilization of the plastic-shell-encased circuit breaker having the automatic locking function is capable of preventing the circuit breaker from being switched on without careful consideration, so as to ensure security of operators.

5 Claims, 8 Drawing Sheets

(51) Int. Cl.

| | |
|---|---|
| ***H01H 9/22*** | (2006.01) |
| ***H01H 9/54*** | (2006.01) |
| ***H01H 21/04*** | (2006.01) |
| *H01H 71/00* | (2006.01) |

(52) U.S. Cl.
CPC .. *H01H 2071/006* (2013.01); *H01H 2221/022* (2013.01); *H01H 2239/056* (2013.01); *H01H 2300/024* (2013.01)

(58) Field of Classification Search
USPC ......... 340/5.7–5.8; 200/43.12, 337, 400, 401
See application file for complete search history.

(56) References Cited

U.S. PATENT DOCUMENTS

2006/0119455 A1* 6/2006 Park ..................... H01H 77/104 335/16
2011/0053557 A1* 3/2011 Despain ................. A47G 29/10 455/410

* cited by examiner

PLASTIC-SHELL-ENCASED CIRCUIT BREAKER HAVING AUTOMATIC LOCKING FUNCTION

CROSS REFERENCE OF RELATED APPLICATION

This is a U.S. National Stage under 35 U.S.C. 371 of the International Application PCT/CN2012/000085, filed Jan. 17, 2012, which claims priority under 35 U.S.C. 119(a-d) to CN 201110036761.9, filed Jan. 30, 2011.

BACKGROUND OF THE PRESENT INVENTION

1. Field of Invention

The present invention relates to a circuit breaker, and more particularly to a plastic-shell-encased circuit breaker having an automatic locking function when a password is set for breaking the circuit artificially.

2. Description of Related Arts

As an important electric power equipment, circuit breaker is widely applied in the field of power consumption management. However, the circuit breaker still has following defects.

In view of function, when the conventional circuit breaker is open for processing an overhaul, if the circuit breaker suddenly closes at a moment when the repairman has not finished the repair work, not only fault occurs in the power system, but also affects the safety of the repairman. Currently, two measures are taken by power stations. The first one is to open the circuit breaker before the repairman goes out to work, and put up a warning sign, which is easy to be neglected by staffs of the power station to close the circuit breaker falsely, which will affects the safety of the workers. The second one is to lock the circuit breaker and wait for the repairman to unlock and close the circuit breaker when the repairman is coming back after finishing repair work. The second measure solves the problem to some extent, but has problems of long return time of the repairman and low efficiency.

In view of the defects mentioned above, the applicants achieves the present invention after long term research and practice.

SUMMARY OF THE PRESENT INVENTION

An object of the present invention is to provide a plastic-shell-encased circuit breaker having an automatic locking function, so as to overcome the defects mentioned above.

Accordingly, in order to accomplish the above objects, technical solution adopted by the present invention is to provide a plastic-shell-encased circuit breaker having an automatic locking function, comprising:

a plastic-shell-encased circuit breaker body;

a user input unit for inputting a lock code or an unlock code;

an authentication processing unit for receiving the lock code or the unlock code from the user input unit, and for outputting a control signal after authentication; and a locking action unit for receiving the control signal from the authentication processing unit, and for enabling the plastic-shell-encased circuit breaker body to produce a self-locking or unlocking action.

The plastic-shell-encased circuit breaker body mentioned above comprises:

a shell body; and an on-off action mechanism provided in the shell body for achieving normal circuit on-off function of the plastic-shell-encased circuit breaker.

The on-off action mechanism comprises:

a handle, provided outside the shell body;

a conductive static contact block;

a conductive movable contact arm, which swings around a rotating shaft, so as to be contacted with or separated from the conductive static contact block; and a linkage control group, comprising a plurality of linkage elements which are coupled, wherein the handle controls swings of the conductive movable contact arm through the linkage control group.

Preferably, the user input unit comprises a keyboard.

Preferably, the authentication processing unit is a microprocessor.

Preferably, the locking action unit comprises:

a linkage rod, which is provided in the shell body and is capable of swinging, wherein the linkage rod has an ejection end and a trigger end, the ejection end is attaching with a linkage element in the linkage control group;

an electromagnet, wherein an end of an armature thereof is matched with the trigger end of the linkage rod;

an action control circuit for receiving the control signal, so as to control electrifying state of coils of the electromagnet.

The action control circuit mentioned above comprises:

a fourth triode and a seventh triode which are connected with two output terminals of the microprocessor;

an eighth triode, wherein a base thereof is connected with a collector electrode of the fourth triode;

a sixth triode, wherein a base thereof is connected with an emitter of the fourth triode;

a fifth triode, wherein a base thereof is connected with an emitter of the seventh triode, an emitter of the sixth triode is connected with an emitter of the fifth triode, and a collector of the fifth triode is connected with an emitter of the eighth triode;

a ninth triode, wherein an emitter thereof is connected with a collector of the sixth triode, a collector of the ninth triode is connected with a collector of the eighth triode;

a ninth diode, provided between a base of the fourth triode and an emitter of the sixth triode; and a twelfth diode, provided between a base of the seventh triode and an emitter of the fifth triode;

wherein an output terminal and an input terminal of coils of the electromagnet are respectively connected between the emitter of the fifth triode and the emitter of the sixth triode.

The user input unit further comprises a wireless transceiver circuit and a remote controller, the wireless transceiver circuit is connected with the authentication processing unit for wirelessly receiving password inputted by the remote controller.

Compared with the prior art, beneficial effects of the present invention are as follows. When the switch is off for overhaul, the circuit breaker can not be switched on indiscriminately to affect security of the repairman while the repair work is not completed. After a long distance repair work is completed, the repairman can inform the power station staffs of the code, and the power station staffs input the code for verifying to switch on, in such a manner that the repairing efficiency is improved.

BRIEF DESCRIPTION OF THE DRAWINGS

FIG. 4 is a sectional view of the plastic-shell-encased circuit breaker having the automatic locking function while switching on.

DETAILED DESCRIPTION OF THE PREFERRED EMBODIMENT

These and other objectives, features, and advantages of the present invention will become apparent from the following detailed description, the accompanying drawings, and the appended claims.

Figure 1:
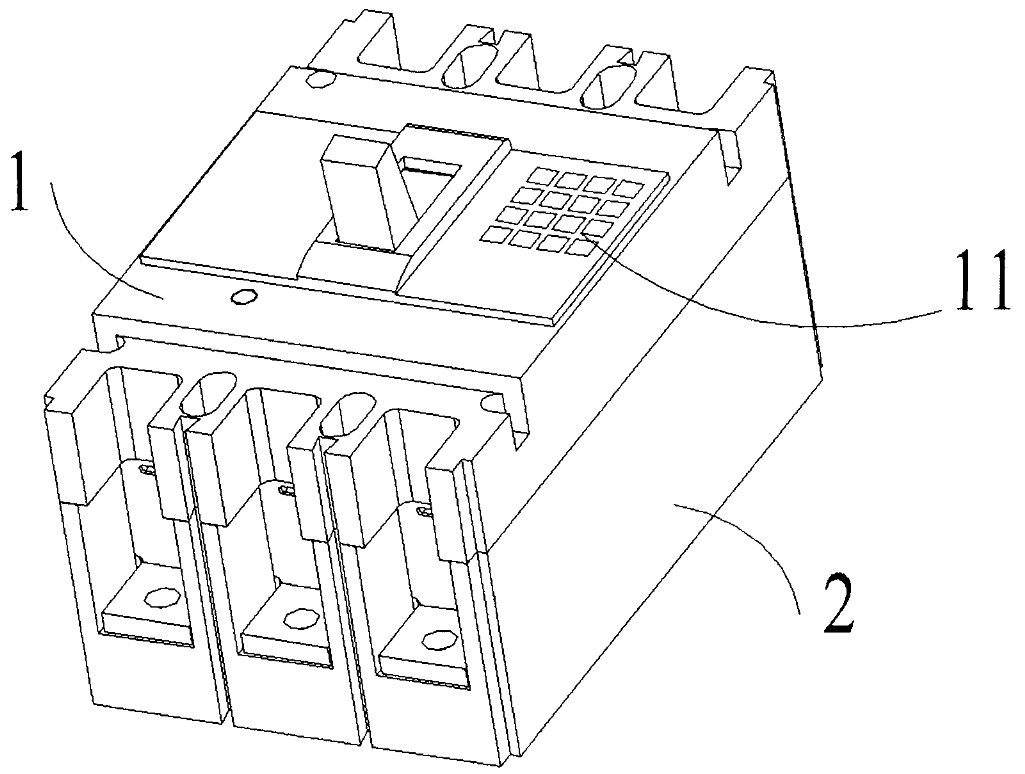
FIG. 1 is a perspective view of a plastic-shell-encased circuit breaker having an automatic locking function according to a preferred embodiment of the present invention.

Referring to FIG. 1 of the drawings, which is a perspective view of a plastic-shell-encased circuit breaker having an automatic locking function of the present invention. The plastic-shell-encased circuit breaker having the automatic locking function by password comprises a plastic-shell-encased circuit breaker body for achieving basic function of a circuit breaker, wherein the plastic-shell-encased circuit breaker body comprises a shell body which comprises an upper cover 1 and a lower case 2, wherein a user input unit 11 is provided on the upper cover 1 for inputting a lock code or an unlock code. The user input unit 11 comprises a keyboard, wherein the keyboard can be a physical keyboard or a touch keyboard.

Figure 2:
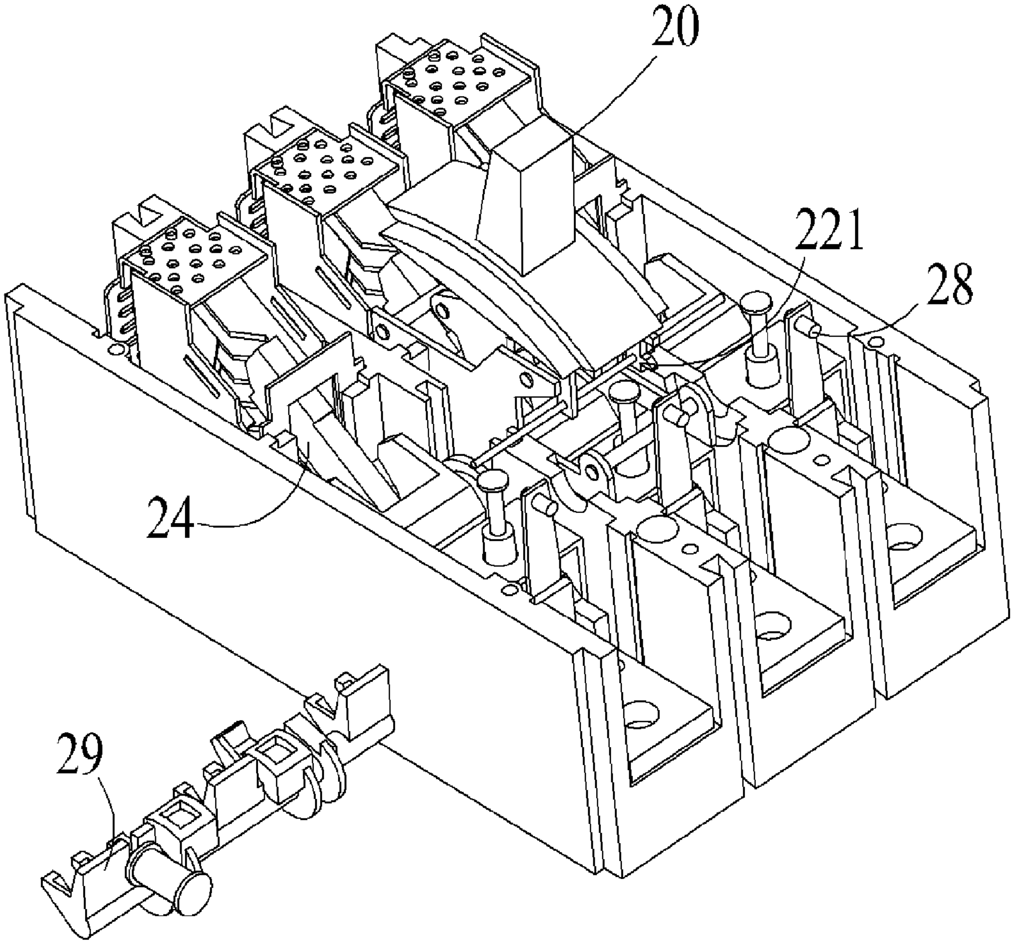
FIG. 2 is a perspective view of the plastic-shell-encased circuit breaker having the automatic locking function without an upper cover according to the preferred embodiment of the present invention.
Figure 3:
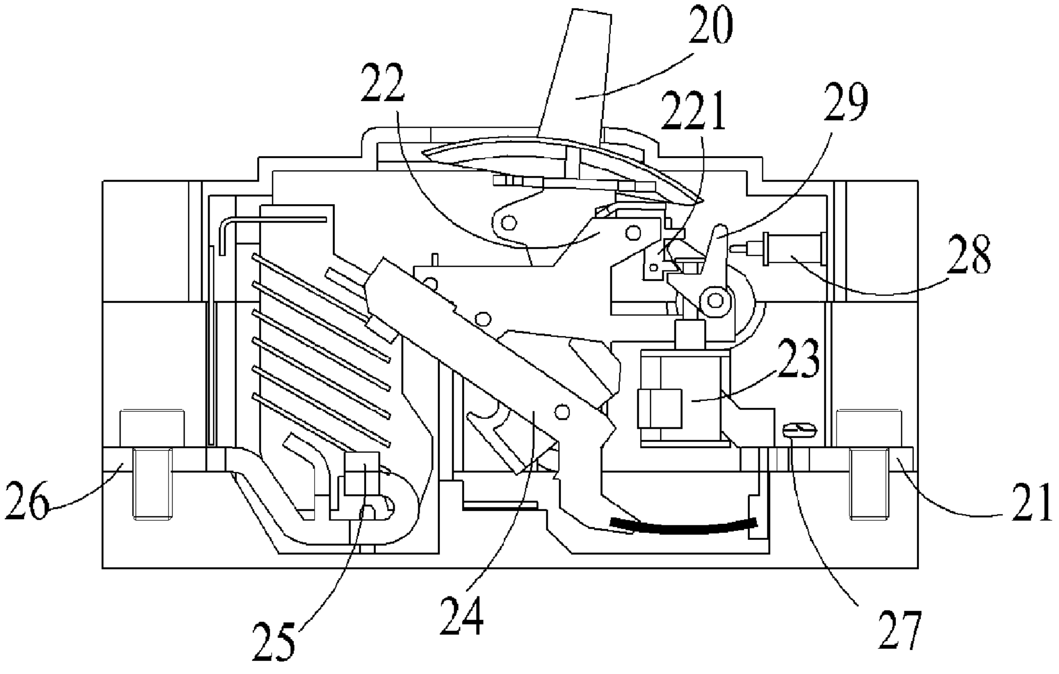
FIG. 3 is a sectional view of the plastic-shell-encased circuit breaker having the automatic locking function while being unlocked and opened.

FIG. 2 and FIG. 3 of the drawings are respectively a perspective view of the plastic-shell-encased circuit breaker having the automatic locking function without an upper cover and a sectional view of the plastic-shell-encased circuit breaker having the automatic locking function while being unlocked and opened. The plastic-shell-encased circuit breaker body further comprises an on-off action mechanism for achieving normal circuit on-off function of the plastic-shell-encased circuit breaker. The on-off action mechanism comprises:

a handle 20, provided outside the shell body for the operators to rotate, so as to achieve controlling on and off of a circuit;

a conductive static contact block 25;

a conductive movable contact arm 24, which swings around a rotating shaft, so as to be contacted with or separated from the conductive static contact block 25; and a linkage control group 22, provided in the shell body and comprising a plurality of linkage elements 221 which are coupled, wherein the handle 20 controls swings of the conductive movable contact arm 24 through the linkage control group 22.

The plastic-shell-encased circuit breaker having the automatic locking function further comprises:

an authentication processing unit provided in the action control circuit for receiving code from the user input unit 11, and for outputting a specified control signal; and a locking action unit for receiving the control signal from the authentication processing unit, so as to generate an action for switching on or off the on-off action mechanism to achieve a locking or an unlocking action.

In this preferred embodiment, the locking action unit comprises:

a linkage rod 29, which is provided in the shell body, wherein the linkage rod has an ejection end and a trigger end, the ejection end is attaching with a linkage element 221 in the linkage control group, wherein when the plastic-shell-encased circuit breaker is in normal operation, the linkage rod 29 is in a stationary state, and at this moment the ejection end is attaching with the linkage element 221;

an electromagnet 28, wherein an end of an armature thereof is matched with the trigger end of the linkage rod, when coils of the electromagnet 28 is electrified, the armature pushes the linkage rod 29 to rotate; and an action control circuit for receiving the control signal, so as to control electrifying state of coils of the electromagnet 28.

Figure 4:
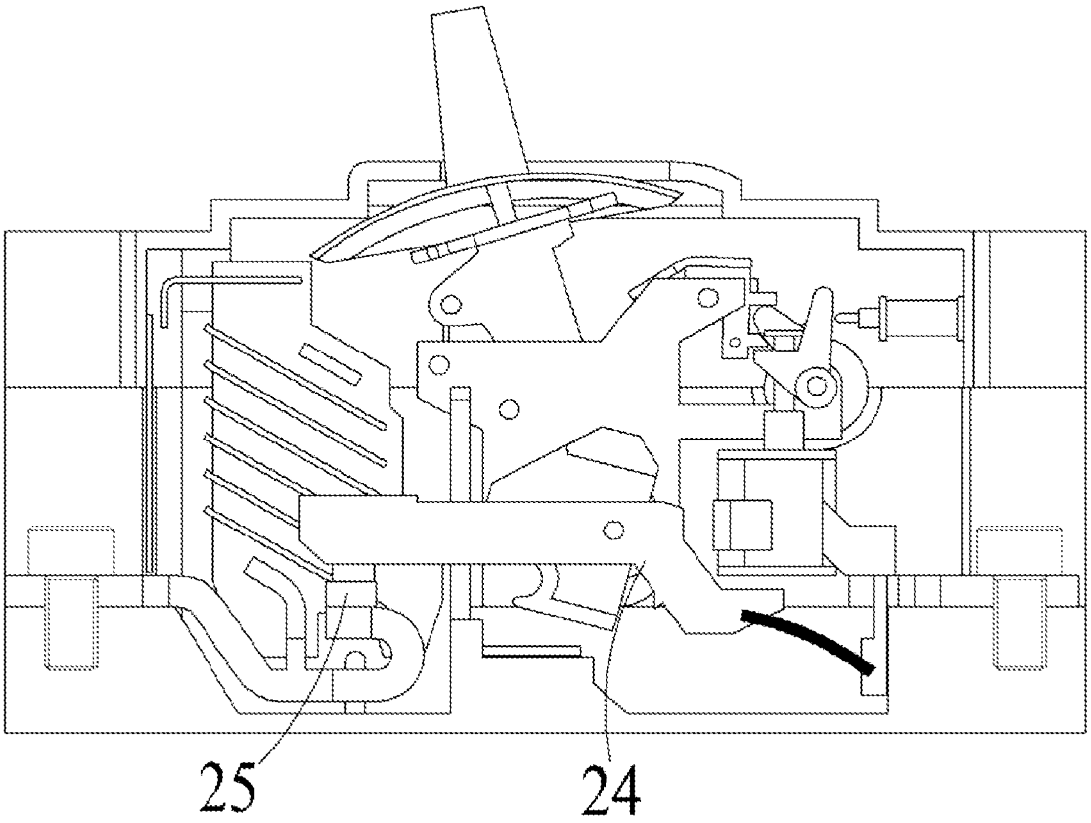

Referring to FIG. 4 of the drawings, FIG. 4 is a sectional view of the plastic-shell-encased circuit breaker having the automatic locking function while switching on, wherein the conductive movable contact arm 24 is contacted with the conductive static contact block 25 and is in a normal usage state, which is coincident with a situation that both the linkage rod 29 and the linkage element 221 are simultaneously in a normal usage state of opening.

Figure 5:
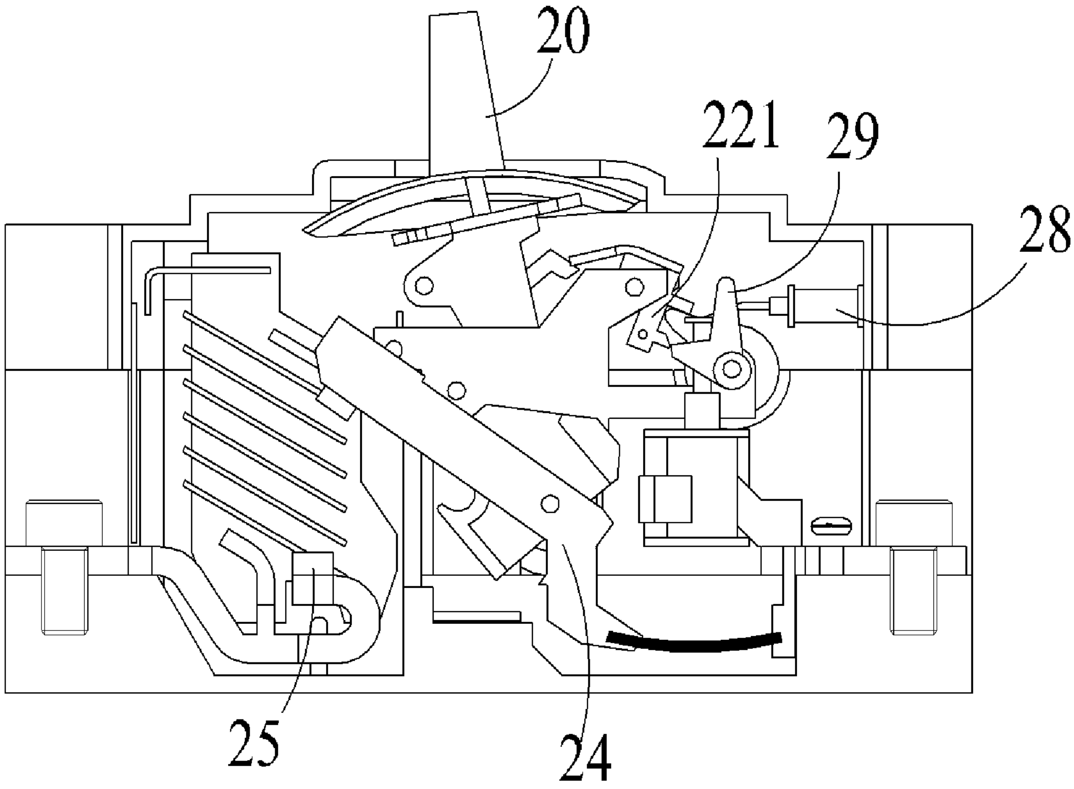
FIG. 5 is a sectional view of the plastic-shell-encased circuit breaker having the automatic locking function while being locked and opened.

Referring to FIG. 5 of the drawings, FIG. 5 is a sectional view of the plastic-shell-encased circuit breaker having the automatic locking function while being locked and opened. In FIG. 5, the handle 20 is rotated to drive the linkage control group 22 to move, so as to separate the conductive movable contact arm 24 from the conductive static contact block 25, meanwhile a lock code is inputted to the user input unit 11, at this moment the locking action unit receives a control signal from the authentication processing unit to conduct coils of the electromagnet 28, in such a manner that the ejection end of the linkage rod 29 pushes the linkage element 221 to rotate by an angle. Then rotating the handle 20 again, since coupling relationship of each linkage element in the linkage control group 22 changes, the linkage control group 22 is not capable of controlling the conductive movable contact arm 24 to generate a rotating action, and finally a self-locking sate is formed.

While inputting a unlock code to the user input unit 11, the locking action unit receives a control signal from the authentication processing unit to open the coils of the electromagnet 28 or reverse a current thereof, in such a manner that the linkage rod 29 rotates under an action of a reset spring or a reset spring in the linkage control group 22, in such a manner that the linkage element 221 returns back to an original position. Then rotating the handle 20 again, since coupling relationship of the linkage control group 22 returns to a normal state, the linkage control group 22 is capable of controlling the conductive movable contact arm 24 to generate a swing action, i.e., self-locking state is unlocked, and a switch on state of the plastic-shell-encased circuit breaker having the automatic locking function is achieved.

Figure 6:
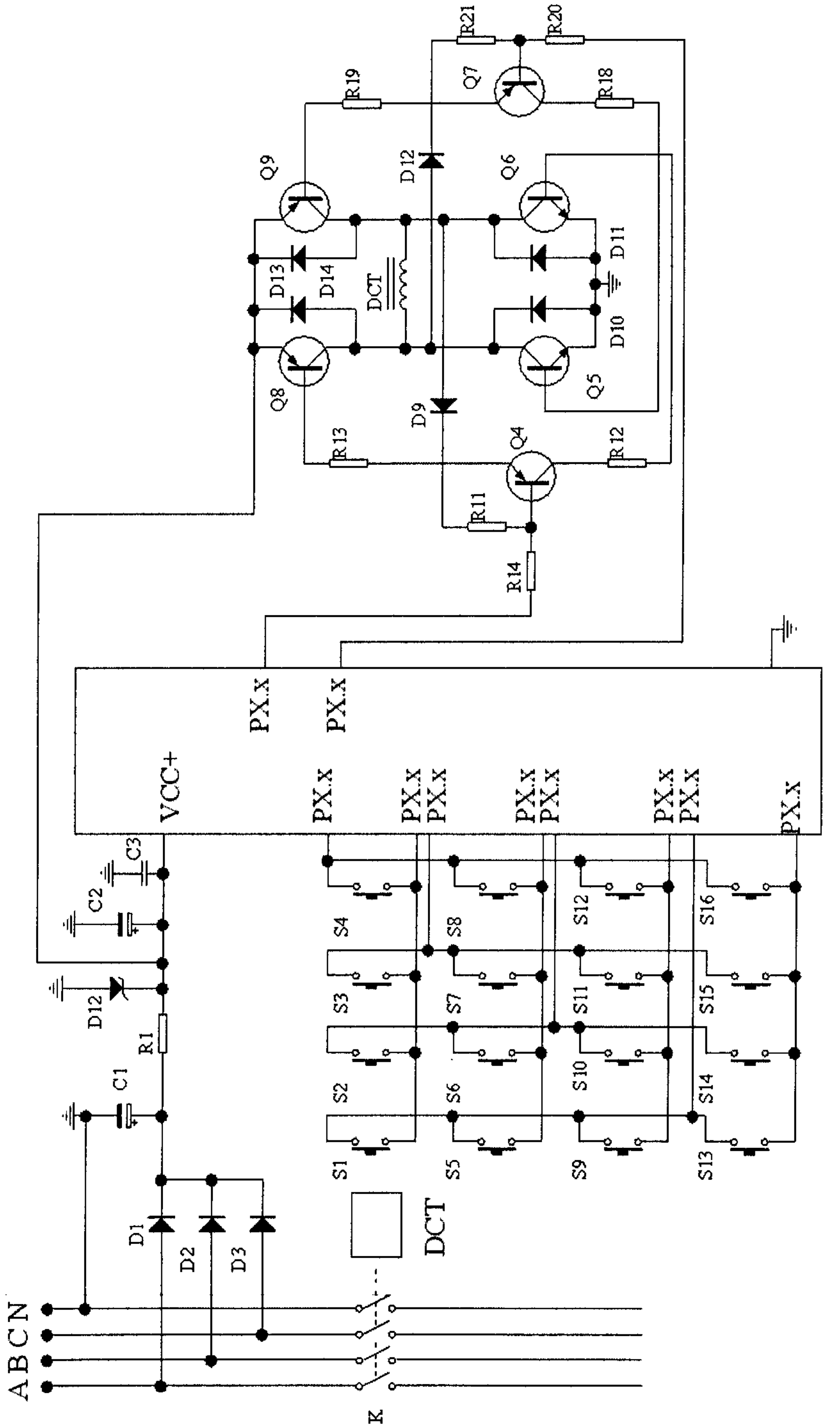
FIG. 6 is a sketch view of an action control circuit of the plastic-shell-encased circuit breaker having the automatic locking function according to a first preferred embodiment of the present invention.

Referring to FIG. 6 of the drawings, FIG. 6 is a sketch view of an action control circuit of the plastic-shell-encased circuit breaker having the automatic locking function according to a first preferred embodiment of the present invention. The control circuit comprises a power source circuit, the user input unit 11, the authentication processing unit and the action control circuit.

Current signals are respectively introduced to the power source circuit from phase lines A, B and C. The current signals is processed with rectification respectively by a first diode D1, a second diode D2 and a third diode D3, processed with filtering by the first capacitor C1, and then processed with depressurization by a resistor R1. A voltage regulator tube D12 is utilized to ensure stabilization of voltages outputted thereof. The power source circuit provides stable voltages to each power consuming device after passing through the voltage regulator tube D12.

The user input unit 11 transfers code information inputted by a user to the authentication processing unit via buttons S1 to S16. The user input unit 11 can utilize a fingerprint sampler to substitute the keyboard. The code information inputted here is the lock code and the unlock code, and the authentication processing unit can be a microprocessor.

The action control circuit comprises:

a fourth triode Q4 and a seventh triode Q7, which are connected with two output terminals of the microprocessor;

wherein a collector of the fourth triode Q4 is connected with a base of an eighth triode Q8, and an emitter of the fourth triode Q4 is connected with a base of the sixth triode Q6;

an emitter of the seventh triode Q7 is connected with a base of the fifth triode Q5;

a collector of the fifth triode Q5 is connected with an emitter of the eighth triode Q8;

a collector of the sixth triode Q6 is connected with an emitter of the ninth triode Q9;

a collector of the ninth triode Q9 is connected with a collector of the eighth triode Q8;

a ninth diode D9 is provided between a base of the fourth triode Q4 and an emitter of the sixth triode Q6;

the twelfth diode D12 is provided between a base of the seventh triode Q7 and an emitter of the fifth triode Q5; and the input terminal and the output terminal of the coils of the electromagnet DCT are respectively connected between an emitter of the fifth triode Q5 and an emitter of the sixth triode Q6.

When the circuit breaker is opened, users input the lock code via the user input unit for the first time, the lock code is confirmed and preserved by the authentication processing unit, the electromagnet DCT is driven by the action control circuit and is in an operation state, and the circuit is not capable of being closed.

Users input an unlock code via the user input unit 11, the microprocessor judges whether the unlock code is in accordance with the lock code preserved beforehand, so as to convert potentials of the first and second output terminals PXx of the microprocessor, wherein the first terminal and the second terminal are arranged from top to bottom in the drawing.

When the microprocessor judges the unlock code is in inconsistent with the lock code preserved beforehand, potential difference of two terminals of the electromagnet DCT maintains as original. When the microprocessor judges the unlock code is correct, the potential difference of two terminals of the electromagnet DCT changes, in such a manner that the armature returns back, and the locking state is released.

Figure 7:
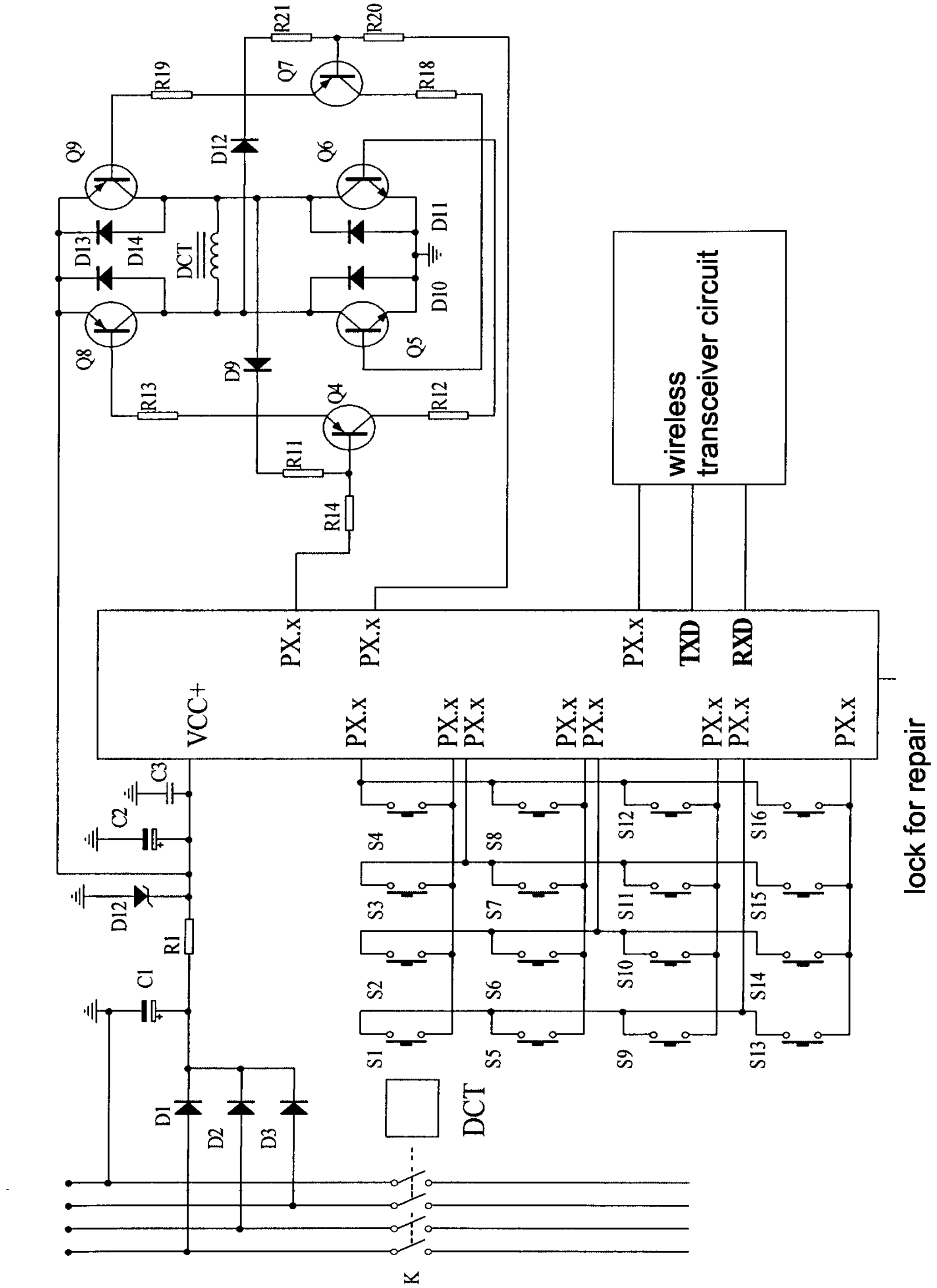
FIG. 7 is a sketch view of the action control circuit of the plastic-shell-encased circuit breaker having the automatic locking function according to a second preferred embodiment of the present invention.

Referring to FIG. 7 of the drawings, FIG. 7 is a sketch view of the action control circuit of the plastic-shell-encased circuit breaker having the automatic locking function according to a second preferred embodiment of the present invention. The user input unit 11 further comprises a wireless transceiver circuit and a remote controller, the wireless transceiver circuit is connected with the authentication processing unit for wirelessly receiving password inputted by the remote controller. Users can be communicated with the wireless transceiver circuit via the remote controller, so as to achieve operating the authentication processing unit by operating on the remote controller. Furthermore, by operating on the remote controller only, direct contraction with the circuit breaker is avoided, which is not only convenient but also safe. When an order is inputted, processing procedure of the authentication processing unit is the same with the keyboard mentioned above, and priority of the keyboard and the wireless operation of the remote controller is set, so as to achieve specific differential operation.

Figure 8:
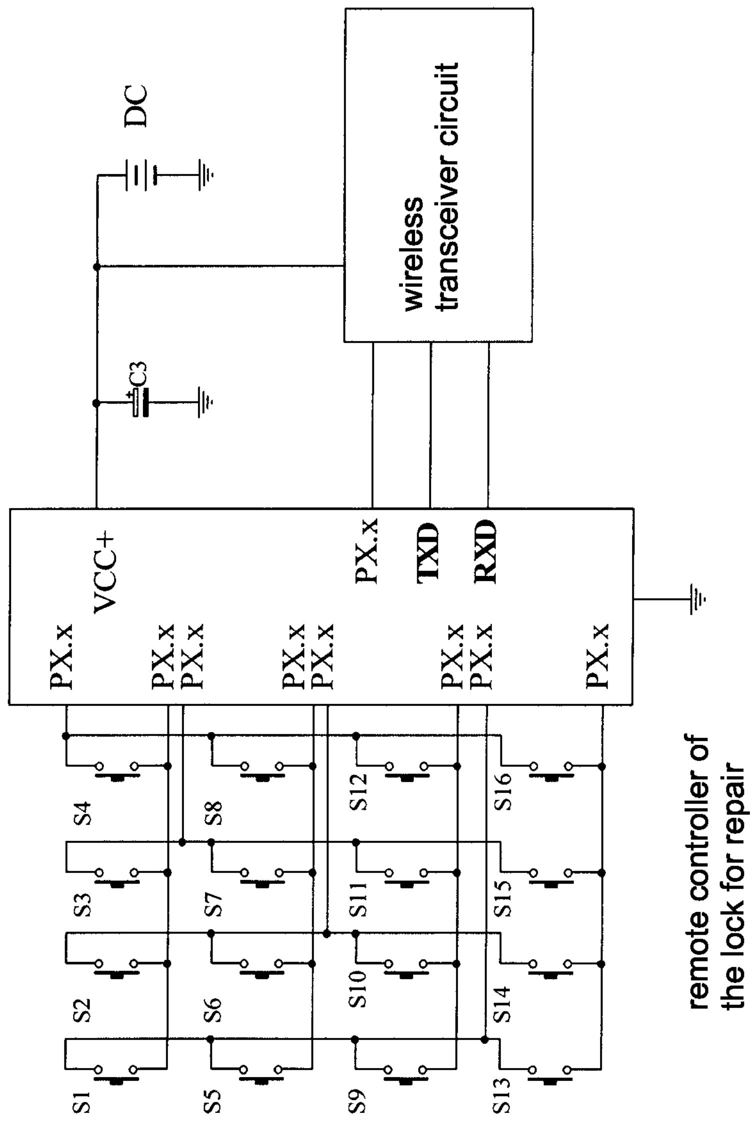
FIG. 8 is a sketch view of a circuit of a remote controller matching with the action control circuit of the plastic-shell-encased circuit breaker having the automatic locking function of the present invention.

Referring to FIG. 8 of the drawings, FIG. 8 is a sketch view of a circuit of a remote controller matching with the action control circuit of the plastic-shell-encased circuit breaker having the automatic locking function of the present invention. The remote controller comprises:

buttons S1 to S16 of the keyboard, a processor connected with the buttons S1 to S16, a wireless transceiver circuit connected with the processor and matched with a wireless transceiver circuit which is provided in a specified user input unit and connected with the authentication processing unit, so as to confirm that the remote controller has an authority for controlling specified plastic-shell-encased circuit breaker.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A plastic-shell-encased circuit breaker having an automatic locking function, comprising:

a plastic-shell-encased circuit breaker body;

a user input unit for inputting a lock code or an unlock code;

an authentication processing unit for receiving the lock code or the unlock code from the user input unit, and for outputting a control signal after authentication; and a locking action unit for receiving the control signal from the authentication processing unit, and for enabling the plastic-shell-encased circuit breaker body to produce a self-locking or unlocking action;

wherein the plastic-shell-encased circuit breaker body comprises:

a shell body; and an on-off action mechanism provided in the shell body for achieving normal circuit on-off function of the plastic-shell-encased circuit breaker;

wherein the on-off action mechanism comprises:

a handle, provided outside the shell body;

a conductive static contact block;

a conductive movable contact arm, which swings around a rotating shaft, so as to be contacted with or separated from the conductive static contact block; and a linkage control group, comprising a plurality of linkage elements which are coupled, wherein the handle controls swings of the conductive movable contact arm through the linkage control group;

wherein the locking action unit comprises:

a linkage rod, which is provided in the shell body and is capable of swinging, wherein the linkage rod has an ejection end and a trigger end, the ejection end is attaching with a linkage element in the linkage control group;

an electromagnet, wherein an end of an armature thereof is matched with the trigger end of the linkage rod;

an action control circuit for receiving the control signal, so as to control electrifying state of coils of the electromagnet.

2. The plastic-shell-encased circuit breaker having the automatic locking function, as recited in claim 1, wherein the action control circuit comprises:

a fourth triode and a seventh triode which are connected with two output terminals of the microprocessor;

an eighth triode, wherein a base thereof is connected with a collector electrode of the fourth triode;

a sixth triode, wherein a base thereof is connected with an emitter of the fourth triode;

a fifth triode, wherein a base thereof is connected with an emitter of the seventh triode, an emitter of the sixth triode is connected with an emitter of the fifth triode, and a collector of the fifth triode is connected with an emitter of the eighth triode;

a ninth triode, wherein an emitter thereof is connected with a collector of the sixth triode, a collector of the ninth triode is connected with a collector of the eighth triode;

a ninth diode, provided between a base of the fourth triode and an emitter of the sixth triode; and a twelfth diode, provided between a base of the seventh triode and an emitter of the fifth triode;

wherein an output terminal and an input terminal of coils of the electromagnet are respectively connected between the emitter of the fifth triode and the emitter of the sixth triode.

3. The plastic-shell-encased circuit breaker having the automatic locking function, as recited in claim 1, wherein the user input unit further comprises a wireless transceiver circuit and a remote controller, the wireless transceiver circuit is connected with the authentication processing unit for wirelessly receiving password inputted by the remote controller.

4. A plastic-shell-encased circuit breaker having an automatic locking function, comprising:

a plastic-shell-encased circuit breaker body;

a user input unit for inputting a lock code or an unlock code;

an authentication processing unit for receiving the lock code or the unlock code from the user input unit, and for outputting a control signal after authentication; and a locking action unit for receiving the control signal from the authentication processing unit, and for enabling the plastic-shell-encased circuit breaker body to produce a self-locking or unlocking action;

wherein the plastic-shell-encased circuit breaker body comprises:

a shell body; and an on-off action mechanism provided in the shell body for achieving normal circuit on-off function of the plastic-shell-encased circuit breaker;

wherein the on-off action mechanism comprises:

a handle, provided outside the shell body;

a conductive static contact block;

a conductive movable contact arm, which swings around a rotating shaft, so as to be contacted with or separated from the conductive static contact block; and a linkage control group, comprising a plurality of linkage elements which are coupled, wherein the handle controls swings of the conductive movable contact arm through the linkage control group;

wherein the user input unit comprises a keyboard, a wireless transceiver circuit and a remote controller, the wireless transceiver circuit is connected with the authentication processing unit for wirelessly receiving password inputted by the remote controller;

the authentication processing unit is a microprocessor;

the locking action unit comprises:

a linkage rod, which is provided in the shell body and is capable of swinging, wherein the linkage rod has an ejection end and a trigger end, the ejection end is attaching with a linkage element in the linkage control group;

an electromagnet, wherein an end of an armature thereof is matched with the trigger end of the linkage rod;

an action control circuit for receiving the control signal, so as to control electrifying state of coils of the electromagnet;

wherein the action control circuit comprises:

a fourth triode and a seventh triode which are connected with two output terminals of the microprocessor;

an eighth triode, wherein a base thereof is connected with a collector electrode of the fourth triode;

a sixth triode, wherein a base thereof is connected with an emitter of the fourth triode;

a fifth triode, wherein a base thereof is connected with an emitter of the seventh triode, an emitter of the sixth triode is connected with an emitter of the fifth triode, and a collector of the fifth triode is connected with an emitter of the eighth triode;

a ninth triode, wherein an emitter thereof is connected with a collector of the sixth triode, a collector of the ninth triode is connected with a collector of the eighth triode;

a ninth diode, provided between a base of the fourth triode and an emitter of the sixth triode; and a twelfth diode, provided between a base of the seventh triode and an emitter of the fifth triode;

wherein an output terminal and an input terminal of coils of the electromagnet are respectively connected between the emitter of the fifth triode and the emitter of the sixth triode.

5. The plastic-shell-encased circuit breaker having the automatic locking function, as recited in claim 4, wherein the user input unit further comprises a wireless transceiver circuit and a remote controller, the wireless transceiver circuit is connected with the authentication processing unit for wirelessly receiving password inputted by the remote controller.

* * * * *